US012576600B2

(12) United States Patent
Minervino et al.

(10) Patent No.: US 12,576,600 B2
(45) Date of Patent: Mar. 17, 2026

(54) MANUFACTURING METHOD OF A PREFORM FOR A TURBOMACHINE COMPONENT MADE FROM COMPOSITE MATERIAL AND CORRESPONDING COMPONENT

(71) Applicant: SAFRAN AIRCRAFT ENGINES, Paris (FR)

(72) Inventors: Matteo Minervino, Moissy-Cramayel (FR); Hervé Grelin, Moissy-Cramayel (FR); Didier Fromonteil, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 98 days.

(21) Appl. No.: 17/995,426

(22) PCT Filed: Apr. 9, 2021

(86) PCT No.: PCT/FR2021/050635
§ 371 (c)(1),
(2) Date: Oct. 4, 2022

(87) PCT Pub. No.: WO2021/205132
PCT Pub. Date: Oct. 14, 2021

(65) Prior Publication Data
US 2023/0166460 A1 Jun. 1, 2023

(30) Foreign Application Priority Data
Apr. 10, 2020 (FR) ...................................... 2003630

(51) Int. Cl.
*B29C 70/44* (2006.01)
*B29B 11/00* (2006.01)
(Continued)

(52) U.S. Cl.
CPC ............ *B29C 70/443* (2013.01); *B29B 11/00* (2013.01); *B29B 11/16* (2013.01); *B29C 70/446* (2013.01); *B29L 2031/08* (2013.01)

(58) Field of Classification Search
CPC ... B29C 70/44; B29C 70/443; B29C 45/0003; B32B 37/10; B32B 37/1009; B32B 38/1866
See application file for complete search history.

(56) References Cited

U.S. PATENT DOCUMENTS 4,169,749 A 10/1979 Clark
4,720,244 A 1/1988 Kluppel et al.
(Continued)

FOREIGN PATENT DOCUMENTS

CN 1687586 A 10/2005
CN 105682903 A 6/2016
(Continued)

OTHER PUBLICATIONS

International Search Report mailed Jul. 27, 2021, issued in corresponding International Application No. PCT/FR2021/050635, filed Apr. 9, 2021, 5 pages.
(Continued)

*Primary Examiner* — Christopher T Schatz
(74) *Attorney, Agent, or Firm* — CHRISTENSEN O'CONNOR JOHNSON KINDNESS PLLC

(57) ABSTRACT

A manufacturing method for a component made from composite material, in particular of a turbomachine, includes the steps of producing a preform with a fibrous reinforcement comprising a first fibrous portion and a second fibrous portion, and injecting a pressurized matrix into an injection chamber of an injection mold, in which the preform is arranged. The method further includes the steps of polymerizing the preform and positioning a flexible pocket that
(Continued)

encloses a fluid and that is arranged between the first fibrous portion and the second fibrous portion before the injection step. The fluid is configured to apply an additional pressure to the preform of the fluid during the polymerization step.

13 Claims, 2 Drawing Sheets

(51) Int. Cl.
   *B29B 11/16*          (2006.01)
   *B29L 31/08*          (2006.01)

(56) References Cited

U.S. PATENT DOCUMENTS

| | | | | |
|---|---|---|---|---|
| 4,808,362 | A * | 2/1989 | Freeman | B29C 70/443 |
| | | | | 264/102 |
| 2010/0170613 | A1 * | 7/2010 | Kendall | B29C 70/44 |
| | | | | 156/60 |
| 2010/0186893 | A1 * | 7/2010 | Ashton | B29C 70/44 |
| | | | | 156/287 |
| 2011/0003163 | A1 * | 1/2011 | Wood | B29C 70/086 |
| | | | | 428/524 |

| | | | | |
|---|---|---|---|---|
| 2011/0318513 | A1 | 12/2011 | Marsal et al. | |
| 2013/0224035 | A1 * | 8/2013 | Alexander | B29B 11/16 |
| | | | | 416/230 |
| 2016/0348518 | A1 | 12/2016 | Podgorski et al. | |

FOREIGN PATENT DOCUMENTS

| | | | |
|---|---|---|---|
| EP | 0 465 169 | A1 | 1/1992 |
| FR | 2 940 173 | A1 | 6/2010 |

OTHER PUBLICATIONS

Written Opinion mailed Jul. 27, 2021, issued in corresponding International Application No. PCT/FR2021/050635, filed Apr. 9, 2021, 6 pages.

English translation of Written Opinion mailed Jul. 27, 2021, issued in corresponding International Application No. PCT/FR2021/050635, filed Apr. 9, 2021, 6 pages.

International Preliminary Report on Patentability mailed Oct. 6, 2022, issued in corresponding International Application No. PCT/FR2021/050635, filed Apr. 9, 2021, 7 pages.

First Office Action, issued in corresponding Chinese Application No. 202180026616.4, filed Sep. 30, 2022, 11 pages.

* cited by examiner

MANUFACTURING METHOD OF A PREFORM FOR A TURBOMACHINE COMPONENT MADE FROM COMPOSITE MATERIAL AND CORRESPONDING COMPONENT

FIELD OF THE DISCLOSURE

The present disclosure relates to the field of components made from composite material from a fibrous reinforcement densified by a matrix, in particular turbomachine components.

BACKGROUND

The prior art comprises the documents EP-A1-0 465 169, U.S. Pat. Nos. 4,720,244, 4,169,749 and FR-A1-2 940 173.

It is known that various turbomachine components, in particular aircraft turbomachine components, can be made of a composite material in order to improve their thermo-mechanical resistance capabilities and reduce their weight. The composite material can be produced from a preform or fabric which is intended to form a fibrous reinforcement and which is embedded in a matrix.

The composite material may be of the monolithic type or it may comprise a core so as to form a composite sandwich material. The latter provides stiffness and lightness to the final component and has long been the only solution allowing to combine these two characteristics. Indeed, the inter-position of a honeycomb core such as a honeycomb or a foam between two monolithic fibrous reinforcement skins or layers (densified by a resin or not impregnated by a resin) allows, on the one hand, to considerably increase the bending stiffness of the final component and, on the other hand, to control the mass at the same time via the introduction of a low-density material at the heart (for the core), where the mechanical loading is low. However, the sandwich compos-ites material may have a low delamination resistance due to a manufacturing problem, excessive stress or impact on the surface.

The delamination resistance must be high for structural turbomachine components such as the Outlet Guide Vane (OGV), which is intended to transmit forces between the gas generator and the nacelle supporting the gas generator and to straighten the secondary airflow in a secondary duct delim-ited by the casing of the gas generator and the nacelle. The use of a fibrous reinforcement which is produced with a three-dimensional weaving whose threads intertwine and evolve in thickness and which is embedded in a liquid-injected matrix such as the RTM method (Resin Transfer Molding) as well as a foam acting as a core, is an interesting solution to reduce the sensitivity to delamination of a multi-layer structure while providing the desired stiffness in bending. During the injection of the matrix into the injection enclosure comprising the preform, the pressure that is applied by a matrix injection device, to convey the matrix, may not be sufficient for the impregnation of the matrix to be homogeneous. This leads to areas of porosity which weaken the final component or even lead to the final component being scrapped. On the other hand, too much pressure can lead to a higher stress on the injection device, which can result in matrix leakage or an error in the geometry of the final component.

SUMMARY

The objective of the present disclosure is to provide a solution allowing for improving the manufacturing method of a composite turbomachine component so as to reduce, in particular, the porosity defects in the components made of composite material while being simple and economical.

This is achieved in accordance with the disclosure by means of a method for manufacturing a component made of composite material, in particular for a turbomachine, the method comprising the following steps:

producing a preform with a fibrous reinforcement com-prising a first fibrous portion and a second fibrous portion, injecting a matrix under pressure into an injection enclo-sure of an injection mold in which the preform is arranged, and polymerizing the preform, the method comprising a step of positioning a flexible bag which contains a fluid and which is arranged between the first fibrous portion and the second fibrous portion before the injection step, the fluid being intended to apply an additional pressure to the preform during the polymerization step.

Thus, this solution allows to achieve the above-mentioned objective. In particular, this flexible bag, e.g. a bladder, filled with fluid, allows to improve the process of injecting the matrix so that it effectively impregnate all the fibers of the preform so as to considerably reduce the areas of porosity and the rate of porosity. The porosity rate obtained with this solution is less than 1%, whereas in the prior art the conventional porosity rate is between 1% and 3%. Indeed, the fluid provides an additional pressure directly from the inside of the preform in addition to the injection pressure of the matrix. In addition, the method is advantageously improved since the risk of clogging occurring when main-taining the injection pressure of the matrix is avoided or even eliminated. The injection system has not been struc-turally modified, which means that this solution is economi-cal, applicable to all components and simple. It should be noted that this method allows to obtain hollow components which can also improve the gain in mass. The mass is reduced to only the mass of the fibrous reinforcement that is required for the structural strength of the component.

The method also comprises one or more of the following characteristics and/or steps, taken alone or in combination:

the fluid is contained under pressure in the flexible bag.

the additional pressure is obtained by a thermal expansion of the fluid in the bag.

the polymerization step is followed by a step of piercing the flexible bag so as to extract the fluid.

the piercing is carried out in an unloaded area of the turbomachine component.

the additional pressure in the flexible bag is monitored and controlled via a pressurizing device connected to the flexible bag.

a conduit is intended to connect the bag to the pressurizing device and is arranged in an unloaded area of the component.

the fluid is evacuated from the flexible bag via the conduit.

the fibrous reinforcement is obtained by a three-dimen-sional or two-dimensional weaving.

the fibrous reinforcement is produced in one component and the preform comprises a first fibrous portion and a second fibrous portion which are woven together in a first area and a second binding area, the preform comprising an unbinding area delimited by a first unbinding line and in which the first and second portions are separated from each other, the unbinding area being arranged between the first and second unbinding area along a longitudinal direction L.

the bag is impermeable.

the additional pressure in the flexible bag is monitored and controlled manually or by an electronic control system.

the three-dimensional weaving has an interlock structure.

the weaving step is carried out flat.

the weaving step is followed by a step of shaping the preform so as to obtain a geometry of the desired turbomachine component.

the fluid is a gas or a liquid.

The disclosure also relates to a turbomachine component made of composite material comprising a fibrous reinforcement densified by a matrix, the turbomachine component being produced by the method as presented above and comprising a first wall and a second wall enclosing between them the flexible bag which is applied to the internal surfaces of the first and second walls, the flexible bag delimiting an empty internal cavity.

In a further characteristic, the turbomachine component is a turbomachine vane comprising a blade with an intrados surface and an extrados surface opposite each other along a transverse axis and which are connected upstream by a leading edge and downstream by a trailing edge, the vane comprising the hollow internal cavity extending into the blade.

The disclosure further relates to a turbomachine comprising at least one component made of composite material as mentioned above.

DESCRIPTION OF THE DRAWINGS

The disclosure will be better understood, and other purposes, details, characteristics and advantages thereof will become clearer upon reading the following detailed explanatory description of embodiments of the disclosure given as purely illustrative and non-limiting examples, with reference to the appended schematic drawings in which.

DETAILED DESCRIPTION

Figure 1:
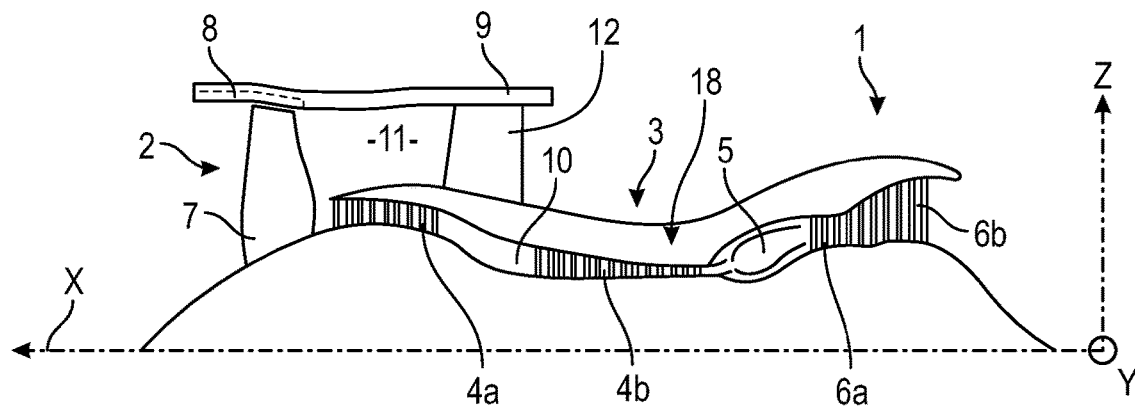
FIG. 1 is a partial axial sectional view of an example of a turbomachine to which the disclosure applies.

FIG. 1 shows an axial and partial cross-section of a turbomachine 1 of longitudinal axis X which comprises various members that may be made of composite materials such as vanes. Of course, the disclosure applies to all types of components that can be made of composite materials.

The turbomachine 1 in FIG. 1 is a dual-flow and dual-body turbomachine intended for mounting on an aircraft.

The turbomachine 1 comprises a fan 2 which is mounted upstream of a gas generator 3 or engine along the flow of the gases in the turbomachine and here along the longitudinal axis X (and even from left to right in FIG. 1). The gas generator comprises, from upstream to downstream, a low-pressure compressor 4a, a high-pressure compressor 4b, a combustion chamber 5, a high-pressure turbine 6a and a low-pressure turbine 6b. The fan 2 comprises a plurality of fan vanes 7 which extend along a radial axis Z, around the longitudinal axis X, and whose free ends are surrounded by a fan casing 8. The fan casing 8 is carried by a nacelle 9, the nacelle 9 and the fan casing 8 being centered on the longitudinal axis X. The fan 2 divides the air entering the turbomachine into a primary airflow which passes through the gas generator and in particular into a primary duct 10, and into a secondary airflow which circulates around the gas generator in a secondary duct 11. Guide vanes (OGV) 12 which are downstream of the fan vanes 7, extending around the longitudinal axis X and across the secondary duct 11 to straighten the secondary airflow.

In this example embodiment, certain components or members of the turbomachine are made of a composite material with a fibrous reinforcement embedded in a matrix. The method for manufacturing a composite material component, in particular a turbomachine component, from composite material comprises the following steps:

producing a preform (or fibrous texture or fabric or ply) with a fibrous reinforcement, injecting a matrix into an injection enclosure in which the preform is arranged, polymerizing or curing the matrix to obtain a rigid final component.

In the first step of producing the preform, the fibrous reinforcement is intended to provide strength to the final component, in particular a structural component such as an OGV vane 12.

Figure 2:
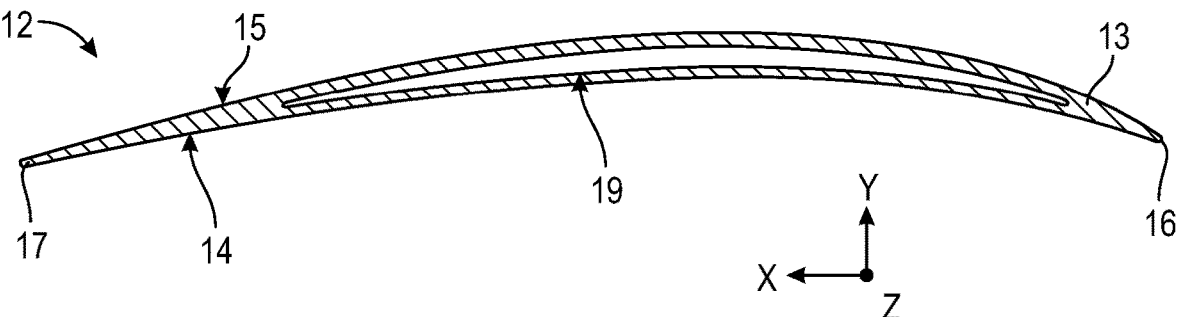
FIG. 2 is a cross-sectional view of a turbomachine vane according to the disclosure.

With reference to FIG. 2, each OGV vane 12 comprises an aerodynamic blade 13 that extends along a stacking axis that is parallel to the radial axis Z here. The blade 13 comprises an intrados surface 14 and an extrados surface 15 which are opposite each other along a transverse axis Y (perpendicular to the longitudinal axis X) and which are connected upstream by a leading edge 16 and downstream by a trailing edge 17. The OGV vane 12 also comprises a radially internal platform (not shown) which is connected to a radially internal end of the blade and a radially external platform (not shown) which is connected to a radially external end of the blade. The radially internal platform is secured to an inter-duct casing 18 (separating the primary duct and the secondary duct) while the radially external platform is secured to a casing of the nacelle 9. In this example, the blade is hollow.

The fibrous reinforcement of the preform is obtained by a three-dimensional weaving (or 3D weaving) or two-dimensional weaving (2D weaving) of threads. In the present disclosure, the term "three-dimensional weaving" or "3D weaving" is understood to mean a weaving method in which warp threads are connected to weft threads in several layers. Preferably, the weaving of the fibrous reinforcement is three-dimensional, which offers a better resistance to delamination. Preferably, but not restrictively, the 3D weaving has an interlock structure (or framework). The interlock weaving has an improved resistance to the impacts, in particular compared to a 2D weaving. Similarly, the preform is woven in one component.

The weaving of the preform is carried out by means of a weaving installation (not shown) comprising a loom which is configured for three-dimensional and/or two-dimensional weaving. The fibrous reinforcement comprises a plurality of warp threads and a plurality of weft threads which are oriented in directions which are perpendicular to each other (in the plane or in the thickness for the 3D weaving). The weaving is advantageously carried out flat along a general longitudinal direction.

The threads or strands used to carry out the weaving comprise fibers of carbon, glass, ceramic, silica, silicon carbide, Kevlar, polyamide, alumina or a mixture of these fibers.

The preform 20 comprises a number of fibrous portions which comprise binding areas and unbinding areas which are produced during the weaving. The portions of the preform each comprise several layers of threads or fibrous layers woven together. In this description, the term "unbindings" is used to refer to areas that are intentionally formed by layers of threads that are not locally connected or woven together. In particular, the unbindings allows layers or fibrous portions to be unfolded or separated from other adjacent layers or fibrous portions at the level of the unbinding areas.

Figure 3:
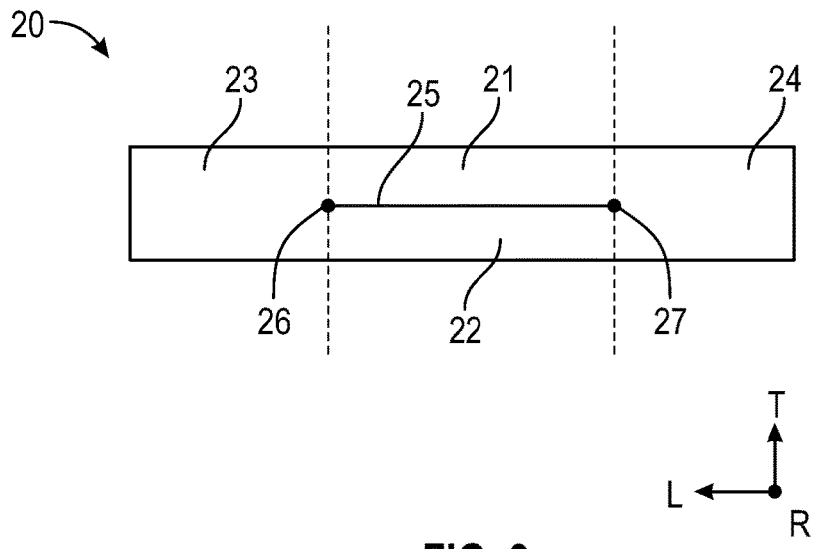
FIG. 3 is a schematic cross-sectional view of an example embodiment of a preform with a woven fibrous reinforcement in a single component for the production of a turbomachine vane blade.

In FIG. 3, and taking the example of a preform 20 for obtaining the blade of an OGV vane as final component, the fibrous reinforcement of the one-part woven preform has a general parallelepiped shape (rectangular parallelepiped). We use the terms longitudinal direction L, radial direction R and transverse direction T to define its dimensions. These directions are perpendicular to each other. The preform 20 comprises at least a first fibrous portion 21 intended to form an intrados wall (carrying the intrados surface 14) of the OGV vane and a second fibrous portion 22 intended to form an extrados wall (carrying the extrados surface 15) of the OGV vane. These first portion 21 and second portion 22 extend in the longitudinal direction L and are superimposed in the transverse direction T. The first and second portions 21, 22 are woven so as to form at least two binding areas (referred to as first binding area 23 and second binding area 24) and at least one unbinding area 25. The first fibrous portion 21 and the second fibrous portion 2 are woven together or connected to each other on the first area 23 which is intended to form the leading edge 16 and on the second area 24 which is intended to form the trailing edge 17. The first fibrous portion 21 and the second fibrous portion 22 are unbound in the unbinding area 25 of the preform, which is located between the first and second binding areas in the longitudinal direction L. The unbindings allow to separate the first fibrous portion from the second portion. The unbinding area is axially delimited by a first unbinding line 26 and a second unbinding line 27. The unbinding lines extend in a radial direction over the entire height of the preform. The lines 26, 27 are defined in a same plane. Fibrous portions, described below, are also provided to form the radially internal and external platforms of the vane. These fibrous portions are woven with the first and second portions 21, 22 and are formed by unbindings.

The weaving step can be followed by a step of cutting the edges of the fibrous reinforcement so that the outline of the preform is as close as possible to that of the final component, here the blade of the vane.

The method may further comprise a wetting in which the fibrous reinforcement of the preform is moistened, for example with water, so that it is easier to handle and in particular to change the orientation of the warp threads with respect to the weft thread (shifting), and then a shaping of the preform in which an operator moves the threads so as to shape the fibrous reinforcement to the profile of the desired blade. Alternatively, the shaping step is carried out simultaneously with the wetting step. The preform is then dried so that the water used for wetting is extracted from it. The preform stiffens after drying and held the shape carried out by the operator. This step can be carried out by heating the fibrous reinforcement in a suitable chamber.

According to another alternative embodiment, the preform shaping step (before the matrix injection explained below) takes place in the injection mold.

Figures 4, 5, 6:
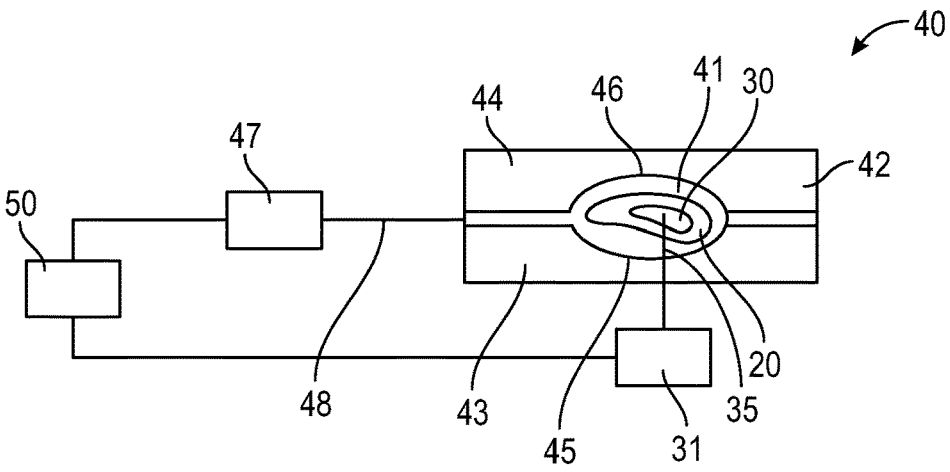
FIG. 4 is a schematic view in axial section of an example of a preform of a turbomachine vane, after shaping the preform.
FIG. 5 is a schematic cross-sectional view in a radial plane perpendicular to a longitudinal direction according to the disclosure.
FIG. 6 is a schematic view of an injection system comprising a matrix injection mold and means for driving the mold pressure and the curing of the matrix according to the disclosure.

The method then comprises a step of positioning a flexible, impermeable bag 30 (such as a bladder) in the preform 20. In particular, as shown in FIGS. 4 and 5 (representing the preform shaped in the mold), the flexible bag 30 is arranged between the first fibrous portion 21 and the second fibrous portion 22. It can be seen in FIG. 4 that the bag 30 is arranged at the level of the unbinding area 25 which allows the separation of the first and second fibrous portions 21, 22. More specifically, the preform also comprises an insertion unbinding area through which the bag 30 is inserted between the first and second fibrous portions 21, 22. The flexible bag has an elongated shape whose length is the same or substantially the same as the height of the preform (in the radial direction). The bag 30 is made of a material that is compatible with the injected matrix. The material of the bag comprises for example a silicone elastomer. Advantageously, this silicone elastomer is of the RTV type (i.e. it is obtained from a composition which cross-links at room temperature).

In the present example, the flexible bag 30 contains a fluid which may be a gas or a liquid. An example of gas would be air, nitrogen or helium. The liquid comprises an oil or a glycol for example. Water can also be used if the polymerization temperature of the matrix used is below 100° C. for example.

Advantageously, but not restrictively, the fluid is injected under pressure into the flexible bag.

In one embodiment, the bag is connected to a pressurizing device 31. In particular, the pressure of the fluid within the flexible bag can be adjusted and/or controlled therein by this pressurizing device 31 which is connected to the flexible bag. The pressurizing device is configured so as to be driven by an operator (either manually) or by an electronic control system 50.

In FIG. 4, the preform 20 comprises an orifice 32 passing through a third fibrous portion 28 and a fourth fibrous portion 29 which are intended to form the radially internal or external platform of the vane. The orifices 32, 32' are located at the level of the unbindings intended to form the third and fourth fibrous portions 28, 29 and at the level of the unbinding area for inserting the bag 30. In an alternative embodiment shown in FIG. 5, a through orifice 32" is provided in one of the first and second fiber portions.

A filler material 33 may be used to fill (or close) the through orifices 32, 32' after sliding the bag inside the preform 20. The filler material also allows to improve the stiffness of the component in compression. Advantageously, the filler material 33 is installed in the mold before injection and after shaping of the dry preform.

In the case of pressurization of the bag by an external pressure, a conduit (35) is provided so as to connect the flexible bag to the pressurizing device 31. More precisely, a passage for connecting the conduit 35 of the pressurizing device 31 to the flexible bag is optionally arranged at the level of the filling material. At least one of the through orifices 32, 32' may be connected to the conduit itself connected to the pressurizing device 31.

The pressurizing device 31 here comprises a pump.

In the injection step, the preform 20 with the flexible bag 30 is previously installed in the injection enclosure 41 in which the matrix will be injected in order to carry out a densification and obtain the final component (the OGV vane). The bag could be placed in the preform 20 and in the injection mold 42 once the preform alone is installed in the mold. Advantageously, the matrix is injected by liquid means and using the RTM technology. The injection enclosure 41 is formed by an injection mold 42 of an injection system 40 shown schematically in FIG. 6. In this example, the injection mold 42 comprises a first portion 43 with a first indentation 45 to accommodate the preform and to give a portion of the shape of the desired component. The injection mold 42 is previously closed by a second portion 44 forming counter-mold and which comprises a second indentation 46 forming the other portion of the shape of the desired final component. The first and the second indentations form the injection enclosure 41 which is sealed for the injection.

The matrix is chosen according to the desired application, here for the OGV vane. The matrix allowing for a densification of the fibrous reinforcement can be a polymeric matrix such as an epoxy-based thermosetting resin or a phenolic resin such as polybismaleimides (BMI). The polymeric matrix may also be a thermoplastic resin. In this description, the terms "resin" and "matrix" are equivalent. The injection mold is connected to an injection device 47 via an array of pipelines 48. These latter and the injection mold 42 are vacuum by appropriate means and the matrix is injected into the injection enclosure.

The matrix is injected at a temperature where it has a lowest viscosity (e.g. between 100° and 200° C.) and advantageously below its polymerization temperature. For an epoxy-based resin, the injection temperature is, for example, between 100° and 160° C. For a phenolic resin (BMI), the injection temperature is, for example, between 160° and 200° C. The matrix that flows into the enclosure impregnates all the fibers of the preform. To promote this impregnation, a pressure is applied inside the injection enclosure. This pressure is between 1 bar and 20 bar. The pressure is advantageously applied by the injection device 47. Advantageously, the pressure in the bag 30 is higher than that inside the enclosure.

Finally, in the polymerization or curing step, the resin is heated, which allows to harden the resin into a rigid final component. The pressure applied during the injection of the resin is maintained during the polymerization so as to reduce the porosity rate in the final component. In particular, during the polymerization step, the fluid within the flexible bag 30 expands which creates an additional pressure on the internal surfaces 34 of the preform 20 which will further reduce the porosity rates. It is during the rise in temperature after injection and to reach the polymerization bearing that the fluid confined in the bag expands. As the bag 30 is flexible and the resistance is provided by the fibers of the preform, the expansion of the fluid results in an increase in the pressure depending on the temperature applied during the polymerization. The additional pressure due to thermal expansion is evenly distributed over the entire surface of the preform 20, which improves the method.

The internal pressure in the bag 30 can be controlled during the polymerization step by driving it with the pressurizing device 31. In this case, this pressure control is only done in the preliminary phases of the polymerization (before the matrix changes from the liquid state to the gel state).

In the case of the additional pressure obtained by thermal expansion, the pressure of the fluid in the bag increases with the formula P/T=k (with P being the pressure, T being the temperature and k being a constant). The temperature variation between the injection temperature and that of the polymerization is in the order of 20° to 50° C., which translates into a pressure variation between +7% and +20%.

Other methods such as the infusion, the RTM light or the Polyflex are, of course, possible. In the scope of the Polyflex technology, an external membrane is arranged on the preform contained in the mold and to close the injection mold. The role of the external membrane is to apply a pressure to the matrix to improve the injection into the mold and into the preform, and also to ensure that the pressure is sufficient and necessary to reduce the areas and rates of porosity.

At the end of this polymerization step, the flexible bag is pierced so as to extract the fluid contained in it. For this purpose, a piercing is carried out in an advantageously unloaded area of the component, such as for example at the level of one of the radially internal and external platforms. By the term unloaded we mean an area that is less mechanically stressed. Advantageously, the piercing is carried out through a platform of the vane or the center of the blade (at the level of one of the internal and external surfaces). Once the bag is emptied, it remains in place in the blade.

Alternatively, when the pressure in the bag is achieved by a fluid held under pressure with the pressurizing device 31, no piercing of the bag is required. However, the conduit 35 allowing the pressurization must be placed in the unloaded area of the component. The fluid is then evacuated from the flexible bag via this conduit 35.

If necessary, a machining of the final rigid component obtained is carried out at the end of the method.

With reference to FIG. 2, the final component, in this case an OGV vane, the cross-section of which is shown, is a monobloc component (produced in one piece) and comprises a three-dimensional fibrous reinforcement densified by a matrix and an empty internal cavity 19 defined by the flexible bag that has been emptied.

The invention claimed is:

1. A method for manufacturing a component made from composite material, the method comprising the following steps of:

producing a preform with a fibrous reinforcement comprising a first fibrous portion and a second fibrous portion, the first fibrous portion comprising a first plurality of layers woven together, the second fibrous portion comprising a second plurality of layers woven together, the first and second plurality of layers being woven together in a first binding area and in a second binding area, the fibrous reinforcement including an unbinding area located between the first and second binding areas, the first plurality of layers being locally unconnected to the second plurality of layers in the unbinding area, injecting a matrix under pressure into an injection enclosure of an injection mold in which the preform is arranged, polymerizing the preform, and positioning a flexible bag which contains a fluid and which, before the step of injecting the matrix, is arranged in the unbinding area between the first fibrous portion and the second fibrous portion, the fluid applying an additional pressure to the preform during the step of polymerizing the preform, wherein the additional pressure in the flexible bag is monitored and controlled during the polymerizing step via a pressurizing device connected to the flexible bag.

2. The manufacturing method according to claim 1, wherein the fluid is injected in the flexible bag.

3. The manufacturing method according to claim 1, wherein the additional pressure is obtained by a thermal expansion of the fluid in the bag.

4. The manufacturing method according to claim 1, wherein the step of polymerizing the preform is followed by a step of piercing the flexible bag so as to extract the fluid.

5. The manufacturing method according to claim 4, wherein the piercing is carried out in an unloaded area of the component.

6. The manufacturing method according to claim 1, wherein a conduit is configured to connect the bag to the pressurizing device and is arranged in an unloaded area of the component.

7. The manufacturing method according claim 1, wherein the fibrous reinforcement is obtained by a three-dimensional or two-dimensional weaving.

8. The manufacturing method according to claim 1, the unbinding area is delimited by first and second unbinding lines, the unbinding area being arranged between the first and second binding areas along a longitudinal direction L.

9. The manufacturing method according to claim 1, wherein the component from composite material is for a turbomachine.

10. A method for manufacturing a component made from composite material, the method comprising the following steps of:

producing a preform with a fibrous reinforcement comprising a first fibrous portion and a second fibrous portion, the fibrous reinforcement being produced in one component, the first fibrous portion and the second fibrous portion being woven together in a first binding area and in a second binding area, the preform comprising an unbinding area delimited by first and second unbinding lines and in which the first and second portions are not locally connected to each other, the unbinding area being arranged between the first and second binding areas along a longitudinal direction L, injecting a matrix under pressure into an injection enclosure of an injection mold in which the preform is arranged, polymerizing the preform, and positioning a flexible bag which contains a fluid and which is arranged in the unbinding area between the first fibrous portion and the second fibrous portion before the step of injecting the matrix, the fluid applying an additional pressure to the preform during the step of polymerizing the preform, wherein the additional pressure in the flexible bag is monitored and controlled via a pressurizing device connected to the flexible bag.

11. A method for manufacturing a component made from composite material, the method comprising the following steps of:

producing a preform with a fibrous reinforcement comprising a first fibrous portion and a second fibrous portion, the first fibrous portion comprising a first plurality of warp threads and weft threads woven together, the second fibrous portion comprising a second plurality of warp threads and weft threads woven together, the first and second plurality of warp threads and weft threads being woven together in a first binding area and in a second binding area, the fibrous reinforcement including an unbinding area located between the first and second binding areas, the first plurality of warp threads and weft threads being locally unconnected to the second plurality of warp threads and weft threads in the unbinding area, injecting a matrix under pressure into an injection enclosure of an injection mold in which the preform is arranged, polymerizing the preform, and positioning a flexible bag which contains a fluid and which, before the step of injecting the matrix, is arranged in the unbinding area between the first fibrous portion and the second fibrous portion, the fluid applying an additional pressure to the preform during the step of polymerizing the preform, wherein the additional pressure in the flexible bag is monitored and controlled during the polymerizing step via a pressurizing device connected to the flexible bag.

12. The manufacturing method according to claim 1, wherein the component from composite material is for a turbomachine vane.

13. The manufacturing method according to claim 11, wherein the component from composite material is for a turbomachine vane.

\* \* \* \* \*